（12）United States Patent
Tan et al.

(10) Patent No.: US 6,449,371 B1
(45) Date of Patent: Sep. 10, 2002

(54) PC SURROUND SOUND MIXER

(75) Inventors: Hock Guan Tan, Serangoon; Edward K. W. Law, Eunos, both of (SG)

(73) Assignee: Creative Technology Ltd. (SG)

( * ) Notice: Subject to any disclaimer, the term of this patent is extended or adjusted under 35 U.S.C. 154(b) by 0 days.

(21) Appl. No.: 09/251,394

(22) Filed: Feb. 17, 1999

(51) Int. Cl.[7] .............................. H04B 1/00; H04R 5/00
(52) U.S. Cl. ........................................ 381/119; 381/22
(58) Field of Search ............................. 381/22, 119, 19, 381/307, 18, 20, 21; 369/89

(56) References Cited

U.S. PATENT DOCUMENTS 5,647,008 A * 7/1997 Farhangi et al. ............. 381/119
5,892,830 A * 4/1999 Klayman ........................ 381/1
5,995,155 A * 11/1999 Schindler et al. ........... 348/460
6,007,228 A * 12/1999 Agarwal et al. .............. 700/94

* cited by examiner

*Primary Examiner*—Forester W. Isen
*Assistant Examiner*—Brian Pendleton
(74) *Attorney, Agent, or Firm*—Townsend and Townsend and Crew LLP

(57) ABSTRACT

A PC audio mixer configured to mix a PC audio signal having one or more PC audio signal channels with an audio surround sound signal having three or more audio surround sound channels, and generate an output signal having at least three output channels which are functions of said PC audio signal and the audio surround sound signal. Preferably, the PC audio signal is an audio signal which is derived from a PC data signal. The PC data signal may comprise a MIDI, WAVE, AIFF, AU, or an MP3 data signal.

82 Claims, 9 Drawing Sheets

PC SURROUND SOUND MIXER

BACKGROUND OF THE INVENTION

The present invention relates generally to a PC surround sound mixing circuit, and more particularly to a circuit configured to receive a plurality of audio signals (both from a PC and other sources), perform a function on the audio signals, and generate a single surround sound output signal having a plurality of output channels from the input signals.

With the introduction of DVD, CD and other audio sources into the PC market, there is a trend to develop new game titles and movies which deploy the surround sound format having three or more audio channels in order to give a realistic, surround sound environment to the PC user. A typical encoded surround sound signal may utilize coding schemes such as Dolby AC-3, Sony Dynamic Digital Sound, Digital Theater Systems, or the like.

However, even though surround encoding is used, many of the PC games still will use common data signals (e.g., WAV, MIDI, AIFF, AU, MP3, or the like) to create effects such as guns shooting, fight noises, or dialogue. Currently, there are two types of mixers available in the market which can be used to play these games. These mixers typically are found in computer sound cards which are configured to receive two sound channels and mix the sound channel with the PC audio signals (i.e., WAV, MIDI, AIFF, AU, MP3, etc.) However, the two line in channels to the computer sound cards only can extract two channels of the surround sound signal, and the mixing of the channels with the PC audio signals can only provide a two channel output. Thus, the surround sound signal is essentially lost.

In addition, a number of surround sound receivers can receive input signals other than surround sound signals. These surround sound receivers typically can decode surround sound signals while also receiving a plurality of channel input signals, for example six-channels, from another source. However, these receivers only can play the decoded surround signal or the signal input from another source. They cannot play both at the same time (i.e., they cannot mix the signal). Thus, a user interface is needed to switch from one signal source to the other. For example, one signal into the receiver may be an encoded surround sound signal from a DVD device, while the other signal into the receiver may be a PC audio signal. Thus, the user must switch from the surround sound signal when a game is playing standard surround signals (i.e., from the DVD device) to common data signals when a game is playing interactive signals, such as guns shooting or fight noises.

Therefore, if a PC user wants to enjoy both common data and surround sound signals simultaneously while playing PC games without any user interference, the PC user must connect the PC data output to special equipment which up-mixes the two-channel PC audio data signal to a six-channel signal which can be played on a six speaker system. Simultaneously, additional equipment is needed to decode the surround signal from the DVD device and load it to six other speakers.

Thus, there is no device which can receive both the surround signal and the PC signal and combine the two into a single surround sound signal.

SUMMARY OF THE INVENTION

Accordingly, it is an advantage of the present invention to provide a PC surround sound mixer apparatus which overcomes the shortcomings of the prior art.

Another advantage of the present invention is that a PC surround sound mixer can receive a plurality of audio input signals from one or more audio sources and generate a single audio surround sound output signal from the plurality of input signals.

Yet another advantage of the present invention is that a PC surround sound mixer is configured to play games, movies, and other applications which include at least one audio signal encoded with a surround sound signal.

Still another advantage of the present invention is that a PC surround sound mixer can mix an encoded surround sound signal from one source with one or more audio signals from one or more other sources to generate a single multi-channel surround sound signal.

Still another advantage of the present invention is that a PC surround sound mixer can receive a plurality of signals, each having one or more audio signal channels and generate a multi-channel surround sound output signal by selecting different audio signal channels from the different input signals.

The above and other advantages of the present invention are carried out in one form by a PC surround sound mixer configured to mix a PC audio signal having one or more audio signal channels with an audio surround sound signal having one or more audio surround sound channels, and generate a PC surround sound output signal having at least three PC surround sound output channels.

In accordance with one embodiment of the present invention, a PC audio mixer, which is configured to mix a PC audio signal having one or more PC audio signal channels with an audio surround sound signal having three (3) or more audio surround channels, may have one or more function generators that are audio signal modulators configured to modulate at least one of the PC audio signal channels with at least one of the audio surround sound channels. The audio signal modulator generates at least one of the output channels, which is a modulation of at least one of the PC audio signal channels with at least one of the surround sound channels. Conversely, the audio signal modulator may be configured to modulate at least one of the audio surround sound channels with at least one of the PC audio signal channels. The audio signal modulator generates at least one of the output channels, which is a modulation of at least one of the surround sound channels with at least one of the PC audio signal channels.

In addition, the PC surround sound mixer may be configured to receive analog signals, digital signals, or a combination of both. The one or more audio signal mixers used in the PC surround sound mixer may be digital signal mixers or analog signal mixers. If the audio signal mixers are analog signal mixers, and one or more of the audio input signals are digital in form, the audio input signals first will pass through a digital-to-analog converter before passing to the audio signal mixers. Similarly, if the audio signal mixers are digital signal mixers, and one or more of the audio input signals are in analog form, the input signal first will pass through an analog-to-digital converter before passing to the digital audio signal mixer.

BRIEF DESCRIPTION OF THE DRAWINGS

A more complete understanding of the present invention may be derived by referring to the detailed description of preferred embodiments and claims when considered in connection with the figures, wherein like reference numbers refer to similar items throughout the figures, and:

DETAILED DESCRIPTION OF PREFERRED EMBODIMENTS

The present invention relates generally to a circuit or system for receiving a plurality of audio input signals and generating a single surround sound output signal having a plurality of audio output channels from the plurality of input signals. While the embodiments of the present invention illustrated in the figures and described herein relate generally to analog and digital signal processing circuits, one skilled in the art will appreciate that other circuit configurations, or one or more software applications may be used to implement the present invention. Therefore, the present invention is not limited to the illustrated embodiments.

In the figures, similar components and/or features have the same reference label. Various components of the same type are distinguished by following the reference label by a dash and a second label that distinguishes among the similar components. If only the first reference label is used, the description is applicable to any one of the several similar components.

Figure 1:
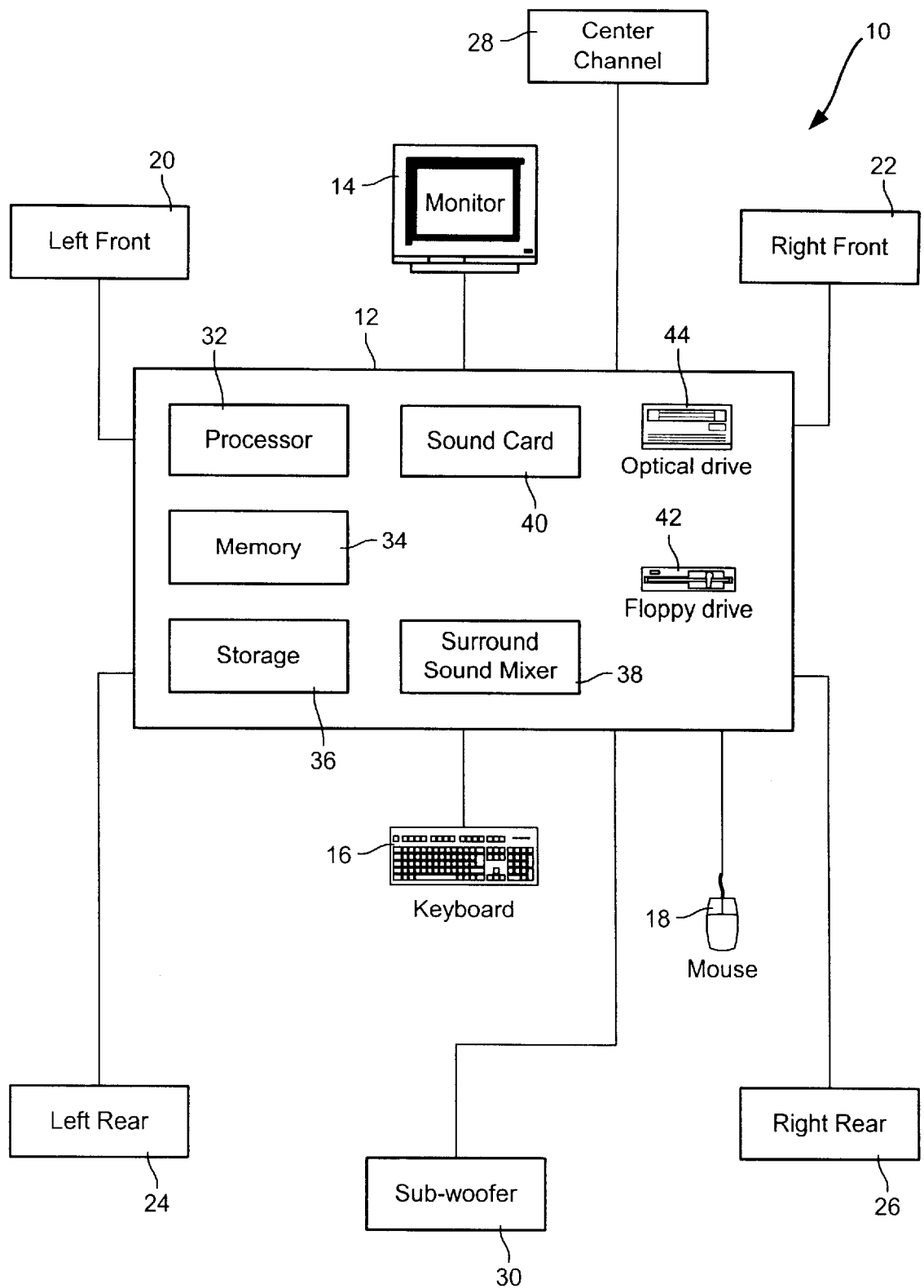
FIG. 1 is a diagram of a computer system embodying a PC surround sound mixer.

Referring now to FIG. 1, a computer system 10 is shown embodying a PC surround sound mixer of the present invention. In particular, computer system 10 may comprise any suitable computer system such as a home personal computer system, or other similar computer workstation system. Computer system 10 suitably comprises a processing unit 12, a monitor 14, a keyboard 16, a mouse 18, and a plurality of speakers 20–30. As one skilled in the art will appreciate, computer system 10 also may comprise a variety of other computer peripherals not illustrated in FIG. 1, or computer system 10 may be configured without one or more of the illustrated peripherals. For example, mouse 18 or one or more of speakers 20–30 may be eliminated from the system.

In accordance with most surround sound systems, computer system 10 preferably comprises six speakers to receive and play a six-channel surround sound signal. In accordance with this aspect of the invention, the speaker configuration of computer system 10 preferably comprises a left front speaker 20, a right front speaker 22, a left rear speaker 24, a right rear speaker 26, a center channel speaker 28, and a subwoofer speaker 30. While most surround sound systems currently known in the art have six speakers driven by a six-channel surround sound signal, one skilled in the art will appreciate that computer system 10 may comprise any number of speakers and surround sound output channels. For example, computer system 10 only may comprise three speakers, such as a left front, a right front, and a center channel speaker configuration. In accordance with this aspect of the invention, computer system 10 only will generate a three-channel signal.

Processing unit 12 preferably comprises a processor 32, a memory 34, a storage 36, a surround sound mixer circuit 38, a sound card 40, a floppy drive 42, and an optical drive 44. Processor 32 may comprise any suitable computer processor, such as an Intel X86 processor, a RISC processor, or any other processor currently known in the art or hereinafter developed. Similarly, memory 34 may comprise any suitable random access memory device such as SRAM, DRAM, flash memory, or the like, and a portion of memory 34 may be configured as cache memory. Storage 36 may comprise any suitable computer storage, such as a hard disk drive, a tape drive, flash memory, or any other suitable computer storage device configured to store application programs, data, and the like.

In addition to the typical processor, memory, and storage which are included in most computer systems, processing unit 12 preferably further comprises a surround sound mixer 38 and a sound card 40. As discussed in more detail below, surround sound mixer 38 is configured to generate a single surround sound output signal from a plurality of input signals. Preferably, sound card 40 is configured to receive a signal from surround sound mixer 38 and generate an analog signal which will drive any of the speakers 20–30. Sound card 40 may comprise any suitable PC sound card currently known in the art or hereinafter developed. In addition, computer system 12 illustrates surround sound mixer 38 and sound card 40 as separate devices or circuit cards, one skilled in the art will appreciate that surround sound mixer 38 and sound card 40 may be combined into a single-circuit configuration or, depending on the configuration of surround sound mixer 38, sound card 40 may be eliminated.

Finally, as illustrated in FIG. 1, processing unit 12 may include a floppy drive 42 and/or an optical drive 44. Floppy drive 42 may be any suitable floppy drive such as a 3¼ or 5¼ floppy disk drive. In addition, optical drive 44 may comprise any suitable optical drive, such as a CD or DVD device. As discussed in more detail below, optical drive 44 may be configured to play music, movies, or games which included surround sound encoded sound signals. In accordance with this aspect of the invention, processing unit 12 may include a surround sound decoding circuit (not shown) or, as discussed in more detail below, surround sound mixer 38 may include the surround sound decoding circuitry.

As mentioned briefly above, the functionality of PC surround sound mixer 38 may be embodied in one or more software application programs rather than an electrical circuit. In such a case, floppy drive 42 or optical drive 44 may be used to load the surround sound mixer application program(s) into computer system 12 and, in particular, into storage 36 and/or memory 34.

While one embodiment of the present invention is illustrated as having PC surround sound mixer 38 embodied in processing unit 12 of computer system 10, one skilled in the art will appreciate that surround sound mixer 38 may be configured in devices outside processing unit 12. For example, surround sound mixer 38 may be a separate computer peripheral, or surround sound mixer 38 may be configured into a stereo surround sound receiver/decoder, such as a Dolby AC-3 receiver. In any event, the present invention is not limited to the embodiment illustrated in FIG. 1.

Figure 2:
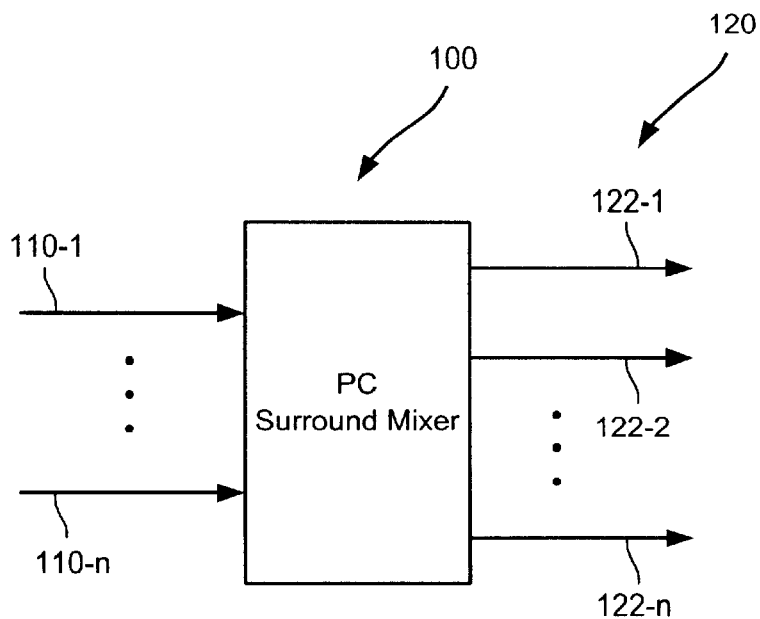
FIG. 2 is a block diagram illustrating the input signals and output signal channels of a PC surround sound mixer.

Referring now to FIG. 2, a block diagram of a PC surround sound mixer 100 in accordance with the present invention is shown. In particular, PC surround sound mixer 100 is configured to receive a plurality of audio input signals 110 and generate an audio surround sound output signal 120 having a plurality of output channels 122. Audio input signals 110 may comprise any suitable audio input signal, such as PC audio data signals (e.g., WAV, MIDI, AIFF, AU, MP3 or any other suitable PC audio data signal), audio surround sound signals, or any other suitable audio signal. In addition, audio input signals 110 may be in serial, parallel, analog, digital or modulated format, or they may comprise PC data files, such as a MIDI file or other suitable PC audio data format. Input signals in digital or data file form preferably are converted to an analog signal before being passed to the speakers. As one skilled in the art will appreciate, the digital-to-analog conversion and the data file signal to analog signal conversion may be configured within PC surround sound mixer or may be configured outside the PC surround sound mixer circuit. For example, input signals 100 may pass through a digital-to-analog converter before entering PC surround sound mixer 100, or alternatively, the output of PC surround sound mixer 100 may be a digital signal and sound card 40 may be configured to convert the digital signal to analog form. As discussed in more detail below, the output channels 122 of output signal 120 may comprise either a mixture of the input signals 110 or selected channels from the individual input signals.

Figure 3:
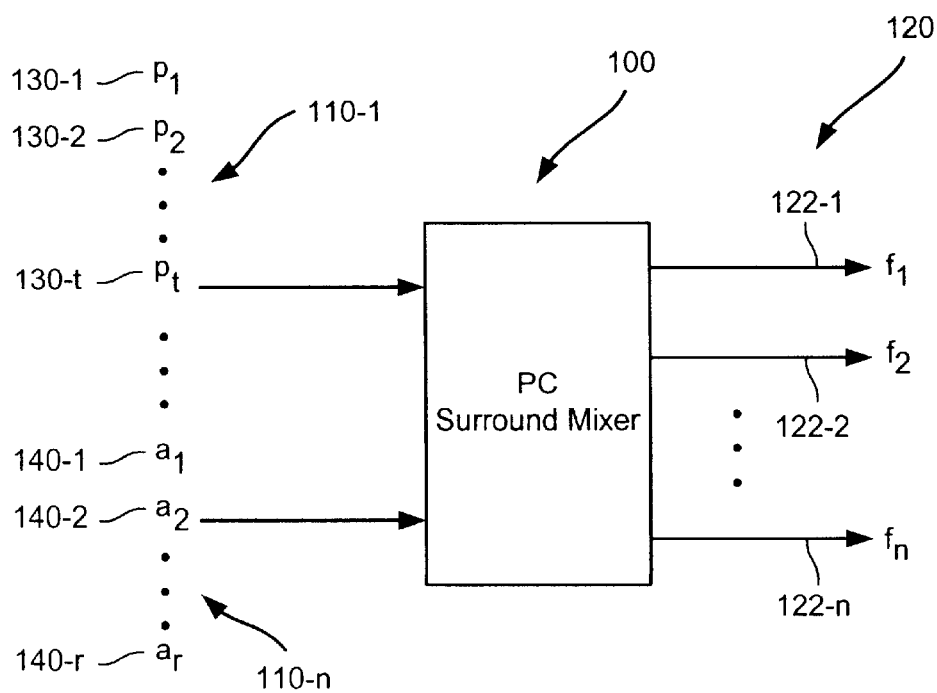
FIG. 3 is a block diagram illustrating that the input signals of the PC surround sound mixer may comprise a plurality of audio signal channels.

Referring now to FIG. 3, PC surround sound mixer 100 is shown comprising a plurality of audio input signals 110 each having a plurality of audio input channels. For example, as illustrated in FIG. 3, audio input signal 110-1 comprises a plurality of input channels $p_1, p_2, \ldots p_t$ (also labeled 130-1, 130-2 . . . to 130-t). Similarly, audio input signal 110-n comprises a plurality of input signal channels $a_1, a_2, \ldots a_r$ (also labeled 140-1, 140-2 . . . to 14-r). PC surround sound mixer 100 preferably receives input signals 110 and generates output signal 120, which includes a plurality of output channels 122. As illustrated in FIG. 3, output channels 122 also are labeled $f_1, f_2, \ldots f_n$. Output signal 120 is a function of the input signals 110. For example, output signal ($f_i$) may be represented as follows: $f_i = F_i(p_1, p_2 \ldots p_t, \ldots, a_1, a_2 \ldots a_r)$.

As discussed in more detail below, in accordance with specific embodiments of PC surround sound mixer 100, the function $F_i$ applied to input signals 110 to generate output signal 120 may be a summing function, subtraction function, selection function, or any other mathematical operations. Signal modulation by an audio signal modulator is a specific example of just such a function. Moreover, as one skilled in the art will appreciate, PC surround sound mixer 100 may be configured with any number of audio input signals 110 and may generate an output signal having any number of output signal channels 122, which are functions of the audio input signals. In accordance with a preferred embodiment of the invention, PC surround sound mixer 100 preferably comprises at least three (3) output signal channels 122.

Figure 4:
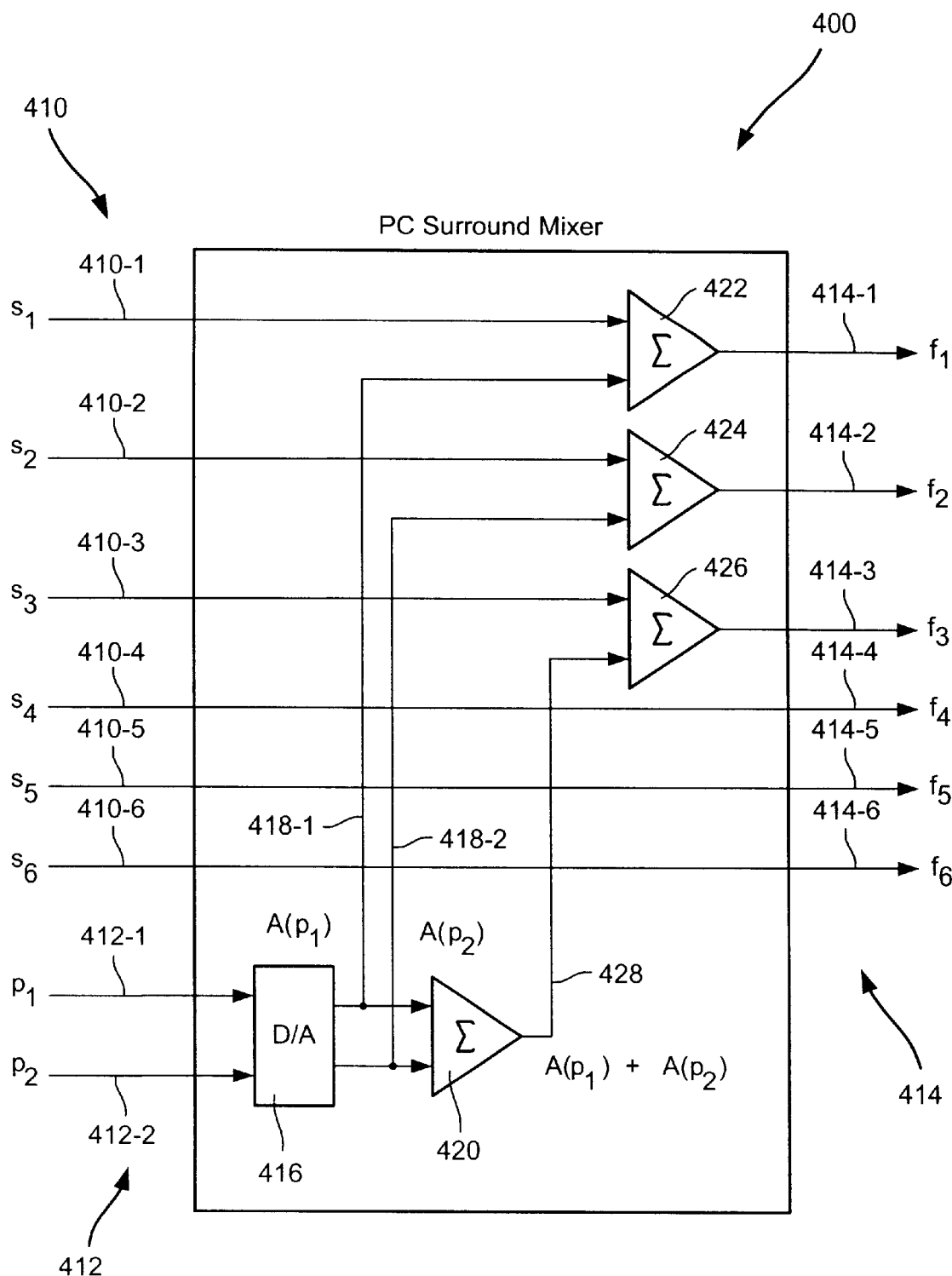
FIG. 4 is a schematic circuit diagram of a first embodiment of a PC surround mixer.

Referring now to FIG. 4, a detailed circuit diagram of a first embodiment of a PC surround sound mixer 400 is illustrated. This particular embodiment of the present invention illustrates that one of the input signals can be a two channel input signal, and that the two input channels can be summed together to generate a third (or more) input channel (s). In accordance with this embodiment of the present invention, PC surround sound mixer 400 preferably comprises a first input signal 410, a second input signal 412, a digital-to-analog converter 416, and first, second, third and fourth summing or mixing circuits 420, 422, 424 and 426, respectively.

In accordance with this particular embodiment of the present invention, first input signal 410 preferably comprises a six-channel audio input signal illustrated by input channels 410-1 to 410-6. Similarly, second audio input signal 412 preferably comprises a two-channel input signal as illustrated by input signal channels 412-1 and 412-2.

In accordance with one aspect of the present invention, first audio input signal 410 preferably comprises a six-channel surround sound signal which has been decoded into six individual parallel analog channels. For example, first audio input signal 410 may comprise a decoded Dolby AC-3 surround sound signal, or other suitable surround sound signal format. Similarly, second input signal 412 preferably comprises a digital audio input signal having two channels; for example, right and left stereo channels. In accordance with this aspect of the invention, second input signal 412 may comprise a two-channel digital audio signal, such as a digital audio signal generated from a WAV, MIDI, AIFF, AU, MP3, or the like audio data format.

Since, in accordance with the illustrated embodiment, the six channels of the first audio input signal 410 are in analog form, and the two channels of the second audio input signal 412 are in digital form, it is preferable to convert the digital signal channels to analog form before mixing them with the analog channels of first input signal 410. Accordingly, input signal channels 412-1 and 412-2 preferably first pass through digital-to-analog converter 416, which generates analog signal channels 418-1 and 418-2, respectively. As illustrated in FIG. 4, analog signal channels 418-1 and 418-2 are input signals to mixing circuits 420, 422 and 424. More particularly, analog signal channels 418-1 and 418-2 are inputs into summing or mixing circuit 420 which generates a single mixed audio signal 428. That is, mixing circuit 420 combines or sums the audio information from analog signal channels 418-1 and 418-2 to create mixed audio signal 428.

In addition, analog signal channel 418-1 is an input to summing or mixing circuit 422, which mixes analog signal channel 418-1 with one of the audio channels of first audio input signal 410. As illustrated in FIG. 4, summing or mixing circuit 422 preferably mixes analog signal channel 418-1 with audio input signal channel 410-1, generating output signal channel 414-1. In a similar manner, summing or mixing circuit 424 preferably mixes audio input signal channel 410-2 with analog signal channel 418-2, generating output channel 414-2. Finally, as illustrated in FIG. 4, summing or mixing circuit 426 is configured to sum mixed audio signal 428 from summing circuit 420 with one of the audio channels of audio input signal 410, generating output signal channel 414-3. In accordance with a preferred embodiment of the invention, mixing circuit 426 mixes third audio input signal channel 410-3 with mixed audio signal 428 generating output channel 414-3. A more detailed discussion of a preferred embodiment of an analog audio mixing circuit in accordance with the present invention is disclosed below with reference to FIG. 10.

While the illustrated embodiment shows analog input channels 418-1 and 418-2 being mixed by circuit 420 to generate signal 428, one skilled in the art will appreciate that circuit 420 can be eliminated. In accordance with this aspect of the invention, signal 428 will not be generated, and analog input signal channel 410-3 merely will pass through the mixer to output signal channel 414-3.

Input signal channels 410-4, 410-5 and 410-6 preferably pass through PC surround sound mixer 400 to output signal channels 414-4, 414-5, and 414-6, respectively. However, one skilled in the art will appreciate that input signal channels 410-4, 410-5 and 410-6 may be mixed with other input signals to generate output signal channels 414-4, 414-5 and 414-6, respectively.

Figure 5:
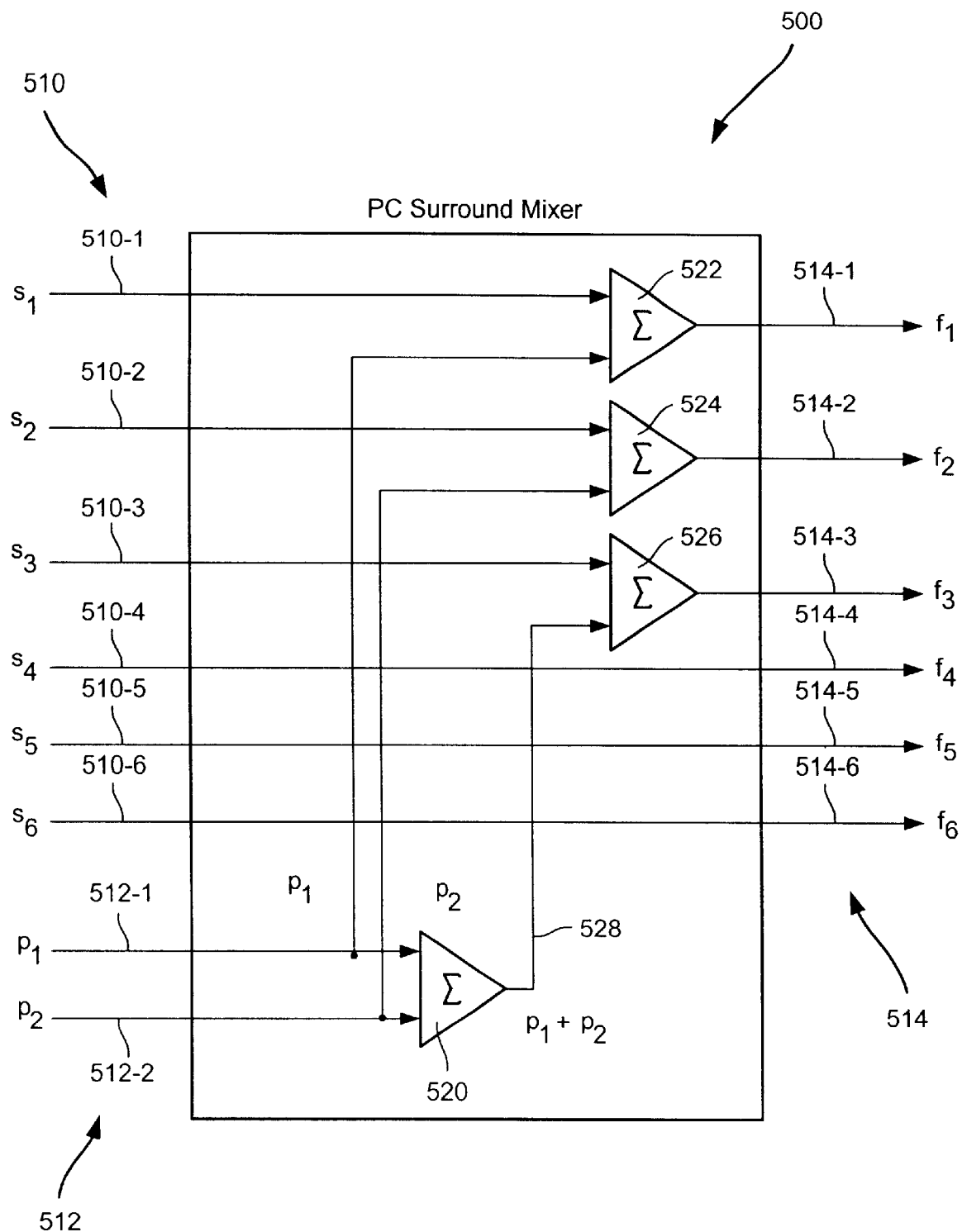
FIG. 5 is a schematic circuit diagram of a second embodiment of a PC surround sound mixer.

Referring now to FIG. 5, a detailed circuit diagram of a second embodiment of a PC surround sound mixer 500 is illustrated. In this particular embodiment, PC surround sound mixer 500 is similar to PC surround sound mixer 400 illustrated in FIG. 4 except that second input signal 512 preferably is in analog form rather than in digital form. That is, in accordance with this embodiment of the invention, second input signal 512 does not first pass through a digital-to-analog converter before being mixed with the audio channels of first audio input signal 510.

Accordingly, as illustrated in FIG. 5, PC surround sound mixer 500 comprises a first input signal 510 having audio input signal channels 510-1 to 510-6, and a second audio input signal 512 having audio input signal channels 512-1 and 512-2. In accordance with this preferred embodiment of the present invention, first audio input signal channel 510-1 of first input signal 510 preferably is summed with first audio input signal channel 512-1 of second input signal 512 by summing circuit 522, generating first output signal channel 514-1. Similarly, second input signal channel 510-2 of first audio input signal 510 preferably is summed with second input signal channel 512-2 of second input signal 512 using summing or mixing circuit 524, generating second output signal channel 514-2.

Still referring to FIG. 5, summing or mixing circuit 520 preferably is configured to receive first and second input signal channels 512-1 and 512-2 of second audio input signal 512 and sum or mix the two channels to generate a single mixed audio signal channel 528. In accordance with this aspect of the invention, mixed audio signal 528 preferably is summed with third input signal channel 510-3 of first input signal 510 by summing circuit 526, generating third output signal channel 514-3. As with the first embodiment illustrated above in FIG. 4, the fourth, fifth and sixth input signal channels 510-4, 510-5 and 510-6 of first audio input signal 510 preferably pass through to fourth, fifth and sixth output signal channels 514-4, 514-5 and 514-6, respectively.

While it is mentioned above that the audio input signals 510 and 512 into PC surround sound mixer 500 are analog signals, one skilled in the art will appreciate that input signals 510 and 512 may be in digital form. In accordance with this aspect of the invention, summing or mixing circuits 520, 522, 524 and 526 will be configured as digital signal mixing circuits and will generate digital output channels 514-1, 514-2, and 514-3, respectively. Accordingly, the embodiment illustrated in FIG. 5 is not limited to an analog circuit.

Figure 6:
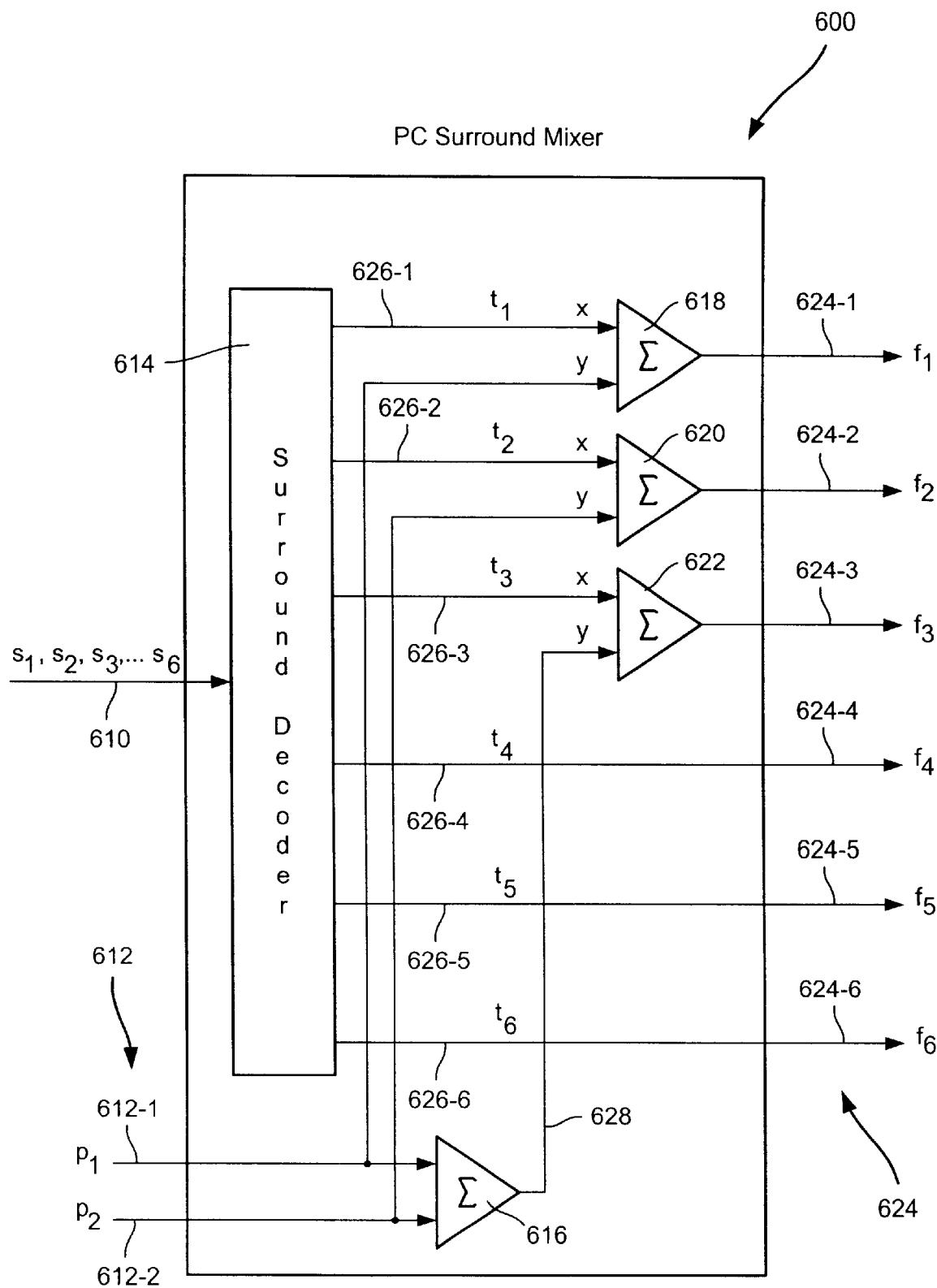
FIG. 6 is a schematic circuit diagram of a third embodiment of a PC surround sound mixer.

Referring now to FIG. 6, a detailed circuit diagram of a third embodiment of a PC surround sound mixer 600 is illustrated. This particular embodiment of the present invention illustrates that the input signals into the PC surround sound mixer can be in serial format. In particular, PC surround sound mixer 600 preferably comprises a first input signal 610, a second input signal 612, a surround sound decoder 614, a first summing circuit 616, a second summing circuit 618, a third summing circuit 620, a fourth summing circuit 622, and an output signal 624.

In accordance with this aspect of the invention, first input signal 610 preferably comprises a surround sound encoded signal in serial form which is received by surround sound decoder 614. Surround sound 614 is configured to divide the six-channel encoded serial surround sound signal into its six individual parallel surround sound channels 626-1 to 626-6.

Second input signal 612 preferably comprises two input signal channels 612-1 and 612-2, respectively. In accordance with this preferred embodiment of the present invention, second summing circuit 618 is configured to receive first surround sound signal channel 626-1 from surround sound decoder 614 and first input signal channel 612-1 of second input signal 612, and mix or sum the two signals to generate first output channel 624-1. Similarly, third summing circuit 620 is configured to receive second surround sound signal channel 626-2 from decoder 614 and second input signal channel 612-2 of input signal 612, and sum or mix the two signals to generate second output signal channel 624-2.

First summing circuit 616 is configured to receive first and second input signal channels 612-1 and 612-2 of second input signal 612 and sum or mix the signal channels, generating mixed audio signal 628. Fourth summing circuit 622 then receives mixed audio signal 628 and third surround sound signal channel 626-3 from decoder 614, and sums or mixes the two signals to generate third output signal channel 624-3. The fourth, fifth and sixth surround sound input signal channels 626-4, 626-5, and 626-6 from decoder 614 are configured to pass through PC surround sound mixer 600 to fourth, fifth and sixth output signal channels 624-4, 624-5, and 624-6, respectively.

Figure 7:
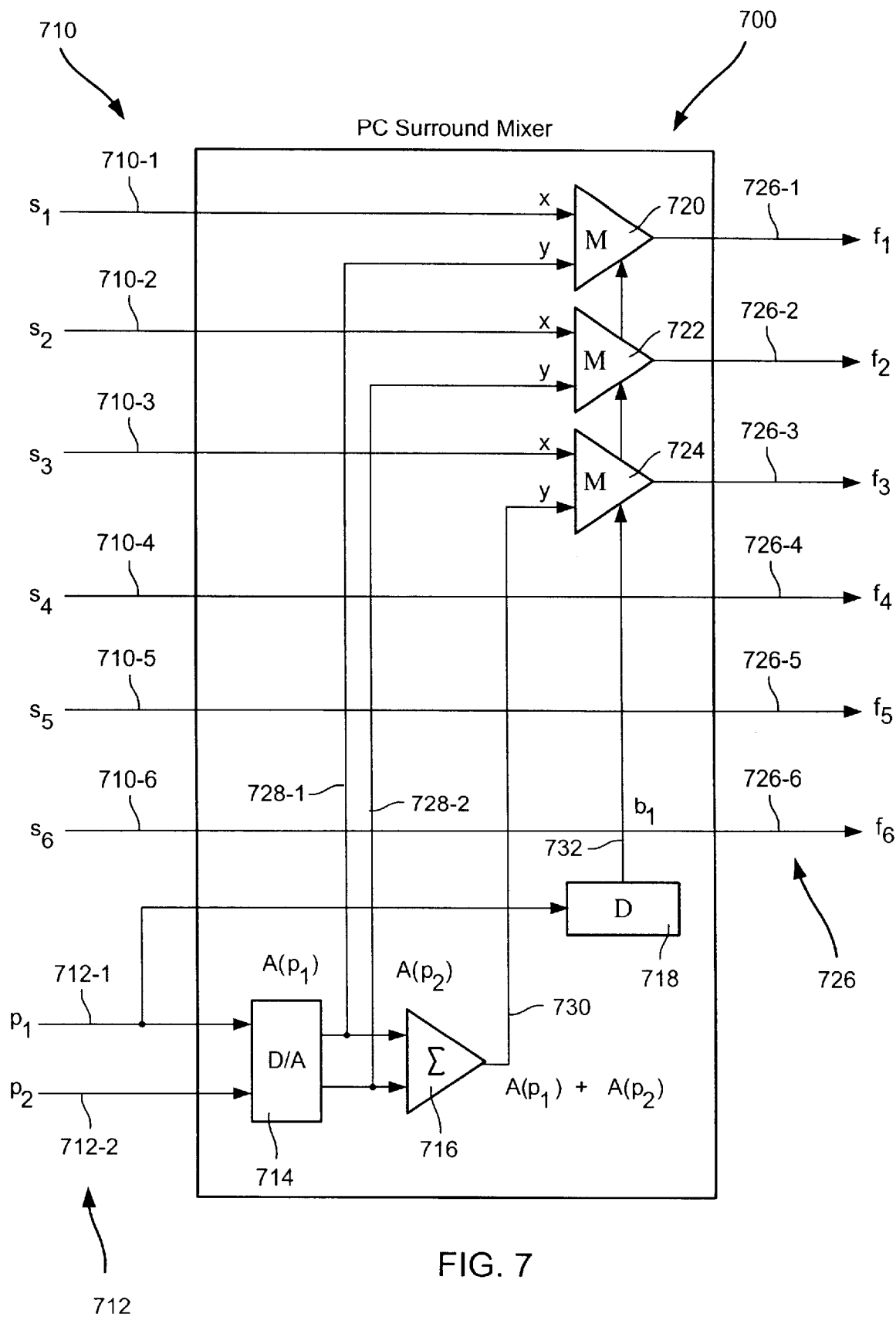
FIG. 7 is a schematic circuit diagram of a fourth embodiment of a PC surround sound mixer.

Referring now to FIG. 7, a fourth embodiment of a PC surround sound mixer 700 is illustrated. This particular embodiment of the present invention illustrates that the output of the PC Surround Sound mixer can be different at different time intervals. For example, at one point in time, the output can be a signal coming only from the first input signal (e.g., a surround sound input), at another point in time, the output can be a signal coming only from the second input signal (e.g., a PC audio input signal), and still at another point in time, the output can be a combination of both the first and second input signals. In accordance with this aspect of the present invention, PC surround sound mixer 700 preferably comprises a first input signal 710, a second input signal 712, a digital-to-analog converter 714, a first summing circuit 716, a signal detector circuit 718, a first multiplexer 720, a second multiplexer 722, a third multiplexer 724, and an output signal 726.

First input signal 710 preferably comprises a surround sound signal having six channels 710-1 to 710-6. 45 Similarly, second input signal 712 preferably comprises a PC data input signal having two channels 712-1 and 712-2.

In accordance with the embodiment illustrated in FIG. 7, first input signal 710 preferably is in analog form and second input signal 712 preferably is in digital form. Accordingly, second input signal 712 preferably passes through a digital-to-analog converter 714 which creates analog signal channels 728-1 and 728-2 from digital input signal channels 712-1 and 712-2, respectively. As one skilled in the art will appreciate, digital-to-analog converter 714 may comprise any 25 suitable digital-to-analog conversion circuit currently known in the art or hereinafter developed.

Analog signal channels 728-1 and 728-2 next preferably pass into first summing or mixing circuit 716 which mixes the two signal channels, generating a single mixed 30 analog audio signal 730.

As illustrated in FIG. 7, first multiplexing circuit 720 preferably is configured to receive a first input signal channel 710-1 from first input signal 710 and first analog signal channel 728-1 from digital-to-analog converter 714. Similarly, second multiplexing circuit 722 is configured to receive a second input signal channel 710-2 from first input signal 710 and second analog signal channel 728-2 from digital-to-analog circuit 714. Finally, third multiplexing circuit 724 is configured to receive a third input channel 710-3 of first input signal 710 and mixed analog audio signal 730 from first summing circuit 716.

In accordance with this aspect of the invention, multiplexing circuits 720, 722 and 724 are configured to select between the input signal channels from first input signal 710 and the analog signal channels from the digital-to-analog converter 714 and pass the selected signal channel to output signal channels 726-1, 726-2, and 726-3, respectively. To determine which input signal channels pass through to the associated output signal channels, multiplexing circuits 720, 722 and 724 preferably receive a channel selection signal 732 from signal detector circuit 718.

Signal detector circuit 718 is configured to receive one or more signal channels from second input signal 712 to determine whether second input signal 712 is present. As illustrated in FIG. 7, signal detector circuit 718 is configured to receive first input signal channel 712-1 from input signal 712. In accordance with this aspect of the invention, if second input signal 712 is present, signal detector circuit 718 generates a high voltage signal which passes to multiplexer circuits 720, 722 and 724. Accordingly, upon detection of second input signal 712, multiplexer circuits 720, 722 and 724 pass signal channels from second input signal 712 to output signal channels 726-1, 726-2 and 726-3, respectively. That is, first multiplexer circuit 720 passes analog signal 728-1 to first output signal channel 726-1; second multiplexing circuit 722 passes second analog signal 728-2 to second output signal channel 726-2; and third multiplexing circuit 724 passes mixed analog signal 730 to third output signal channel 726-3.

On the other hand, if second input signal 712 is not present, signal detector circuit 718 passes a low voltage signal or no signal to multiplexers 720, 722 and 724. In accordance with this aspect of the invention, multiplexing circuits 720, 722 and 724 then pass signal channels from first input signal 710 to output signal channels 726-1, 726-2 and 726-3, respectively. That is, first multiplexing circuit 720 passes first input signal 710-1 to first output signal channel 726-1; second multiplexing circuit 722 passes second input signal channel 710-2 to second output signal channel 726-2; and third multiplexing circuit 724 passes third input signal channel 710-3 to third output signal channel 726-3. In either case, in accordance with the illustrated embodiment, fourth, fifth and sixth output signal channels 726-4, 726-5 and 726-6 preferably comprise fourth, fifth and sixth input signal channels 710-4, 710-5 and 710-6, of first input signal 710, respectively.

Figure 8:
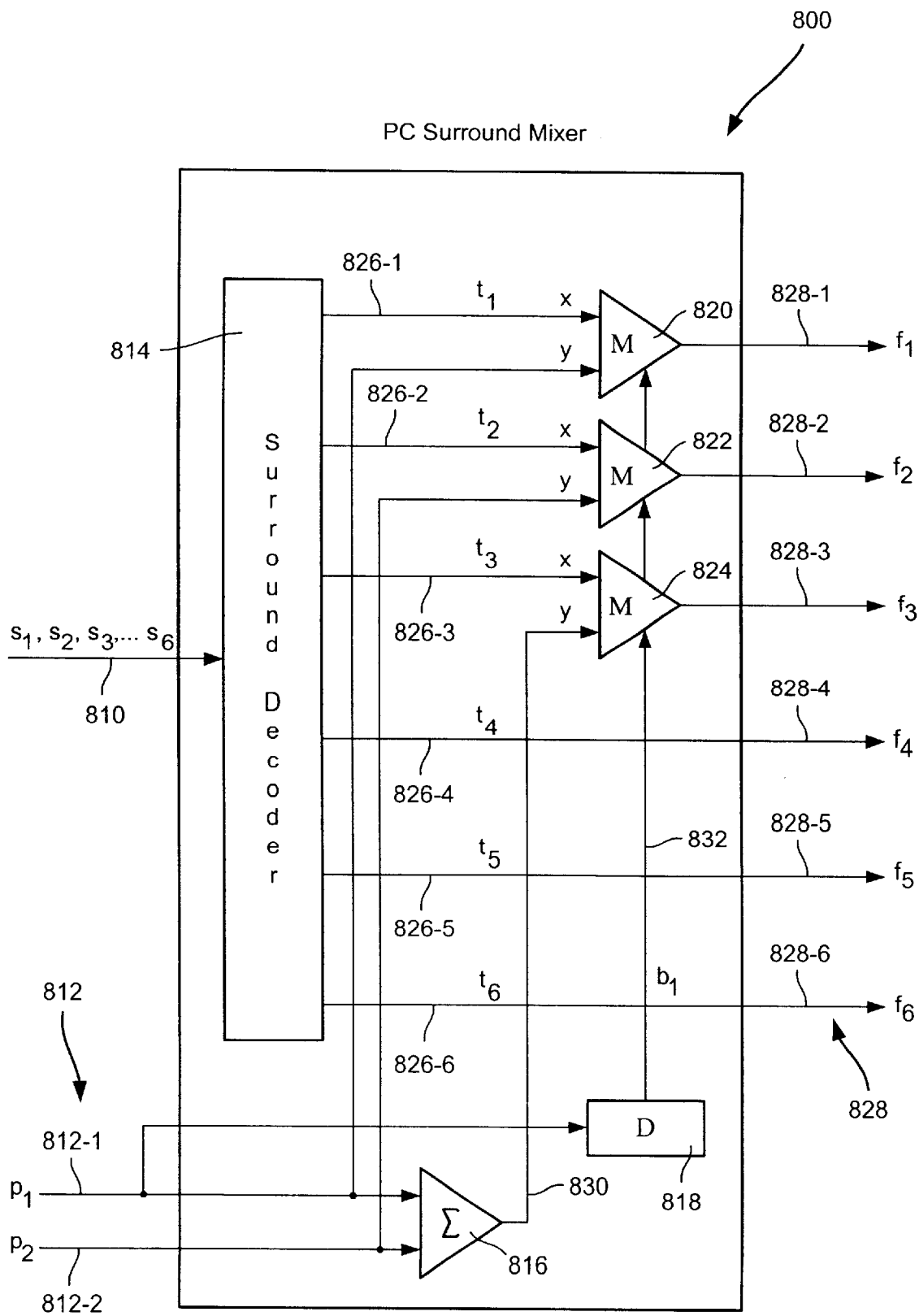
FIG. 8 is a schematic circuit diagram of a fifth embodiment of a PC surround sound mixer.

Referring now to FIG. 8, a fifth embodiment of a PC surround sound mixer 800 is illustrated. In accordance with this preferred embodiment of the present invention, PC surround sound mixer 800 preferably comprises a first input signal 810, a second input signal 812, a surround sound decoding circuit 814, a summing circuit 816, a signal detector circuit 818, a first multiplexing circuit 820, a second multiplexing circuit 822, a third multiplexing circuit 824, and an output signal 828.

First input signal 810 preferably comprises a single serial input signal having six surround sound audio channels encoded therein. In accordance with this aspect of the invention, first input signal 810 preferably passes into surround sound decoder circuit 814 which divides the serial input signal into its six individual parallel audio signal channels 826-1 to 826-6. Second input signal 812 preferably comprises an analog input signal having two channels 812-1 and 812-2; preferably right and left stereo channels. Summing circuit 816 is configured to receive first and second input signal channels 812-1 and 812-2 of second input signal 812 and sum or mix these signals to generate a single mixed analog signal 830.

As discussed above with reference to FIG. 7, first, second and third multiplexing circuits 820, 822 and 824 are configured to receive input signal channels from first input signal 810 and second input signal 812 and select one of the channels to pass to output signal 828. In accordance with this aspect of the invention, multiplexing circuits 820, 822 and 824 are configured to receive a channel selection signal 832 from signal detector circuit 818. Signal detector circuit 818 works in the same manner as the signal detector circuit discussed above with reference to FIG. 7. Thus, if second input signal 812 is present, detector circuit 818 generates a high voltage signal, and first multiplexing circuit 820 passes first input signal 812-1 of second signal 812 to first output signal channel 828-1; second multiplexing circuit 822 passes second input signal channel 812-2 of second input signal 812 to second output signal channel 828-2; and third multiplexing circuit 824 passes mixed analog signal 830 to third output signal channel 828-3.

If second input signal 812 is not present, signal detector circuit 818 passes a low voltage signal or no signal to the multiplexing circuits, and first multiplexing circuit 820 passes first surround sound signal 826-1 from surround sound decoder 814 to first output signal channel 828-1; second multiplexing circuit 822 passes second surround sound signal channel 826-2 from surround sound decoder circuit 814 to second output signal channel 828-2; and third multiplexing circuit 824 passes third surround sound signal channel 826-3 from surround sound decoder 814 to third output signal channel 828-3. Fourth, fifth and sixth surround sound signal channels 826-4, 826-5 and 826-6 from decoder 814 preferably pass to fourth, fifth and sixth output signal channels 828-4, 828-5 and 828-6, respectively.

Figure 9:
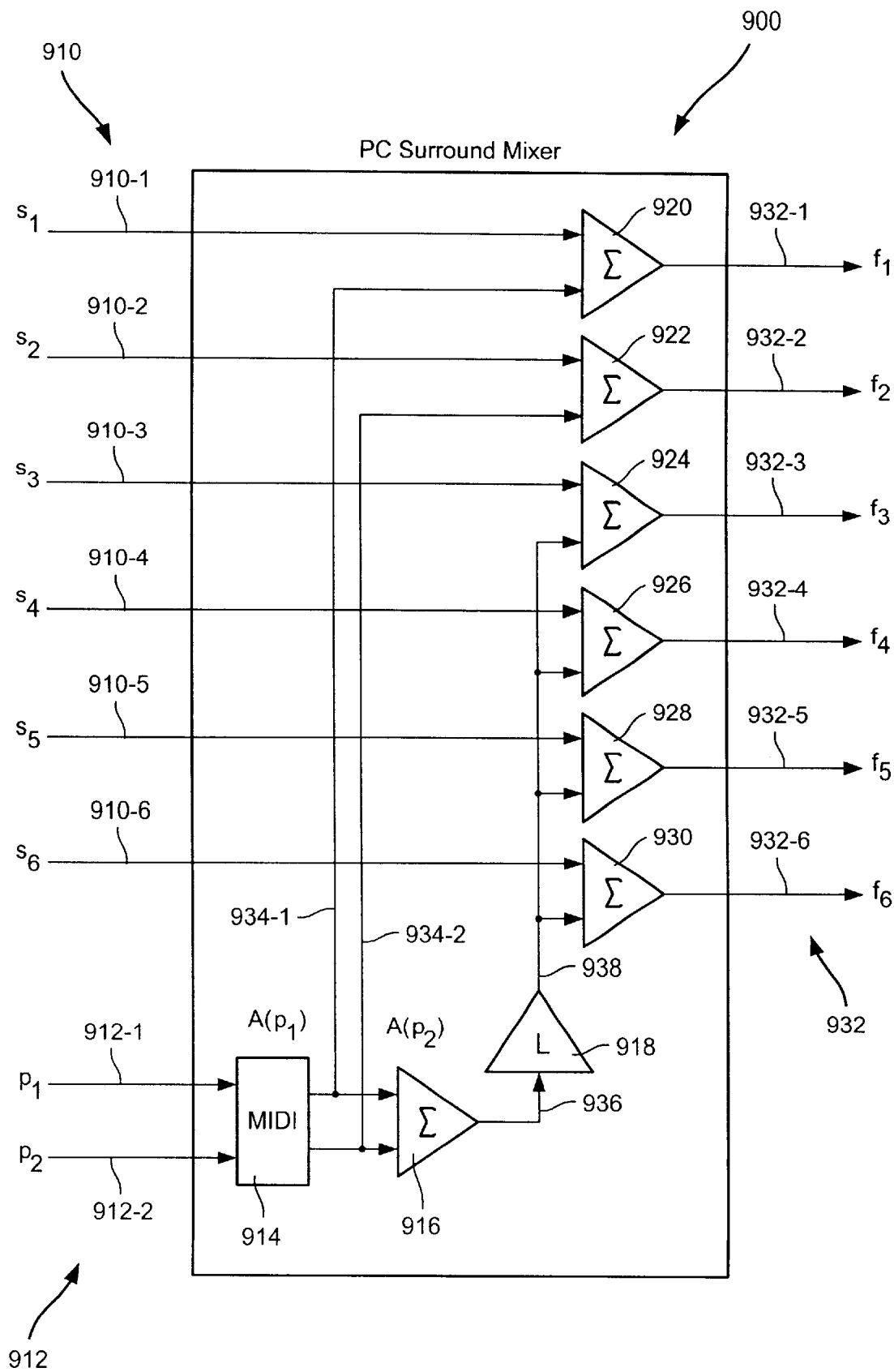
FIG. 9 is schematic circuit diagram of a sixth embodiment of a PC surround sound mixer.

Referring now to FIG. 9, a sixth embodiment of a PC surround sound mixer 900 is illustrated. This particular embodiment illustrates that one of the inputs can be a MIDI data input, and that two MIDI data channels can be summed together to form a third MIDI input channel. In accordance with this aspect of the present invention, PC surround sound mixer 900 preferably comprises a first input signal 910, a second input signal 912, a MIDI file audio generator 914, a first summing circuit 916, a low pass filter 918, second, third, fourth, fifth, sixth and seventh summing circuits 920–930, respectively, and an output signal 932.

First input signal 910 preferably comprises a surround sound signal having six input signal channels 910-1 to 910-6. Second input signal 912 preferably comprises a MIDI data signal configured to produce two data channels 912-1 and 912-2. Channels 912-1 and 912-2 of second input signal 912 pass into MIDI data file audio generator 914 which is configured to convert the MIDI data signal channels to analog audio signal channels 934-1 and 934-2. Analog audio signal channels 934-1 and 934-2 preferably pass into first summing circuit 916 which mixes the two signal channels and generates a single mixed analog signal 936. Analog signal 936 then passes through low pass filter 918, generating signal 938 which comprises only the low frequencies from mixed analog signal 936.

Summing circuits 920–930 are configured to receive input channels 910-1 to 910-6, respectively, from first input signal 910, as well as analog audio signal channels 934-1, 934-2, and audio signal 938 which comprises the low frequencies from mixed analog signal 936. In accordance with this aspect of the invention, second summing circuit 920 is configured to receive first input signal channel 910-1 from first input signal 910 and first audio signal channel 934-1 from the MIDI signal generator 914, and mix the two signals to generate first output signal channel 932-1. Similarly, third summing circuit 922 is configured to receive second input signal channel 910-2 of first input signal 910 and second audio signal channel 934-2 from MIDI signal generator 914, and sum or mix the two signals to generate second output signal channel 932-2. Fourth summing circuit 924 is configured to receive third input signal channel 910-3 from first input signal 910 and signal 938 from low pass filter 918, and mix the two signals to generate third output signal channel 932-3. In a similar manner, fifth, sixth and seventh summing circuits 926, 928 and 930 are configured to receive fourth, fifth and sixth input signal channels 910-4, 910-5 and 910-6 of first input signal 910, respectively, as well as signal 938 from low pass filter 918, and to mix the individual input signal channels with signal 938 to generate fourth, fifth and sixth output channels 932-4, 932-5 and 932-6, respectively.

While the embodiment illustrated in FIG. 9 is disclosed herein as MIDI data file, any particular PC audio data format may be used. For example, instead of MIDI, the PC audio data signal can be WAV, AIFF, AU, MP3, or any other suitable PC audio data format.

Figure 10:
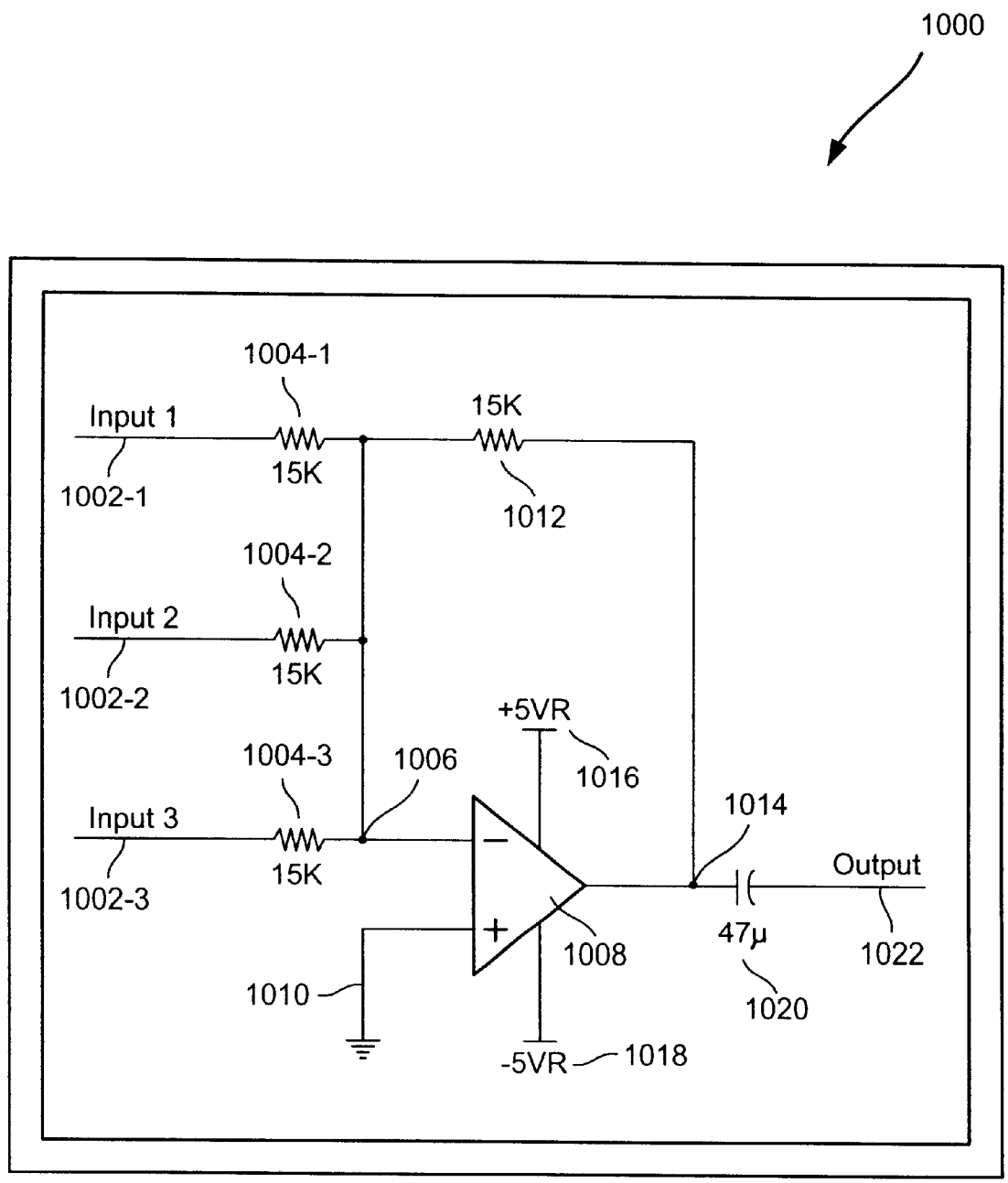
FIG. 10 is a detailed circuit diagram of an analog audio signal mixing circuit which may be used in conjunction with the PC surround sound mixer embodiments illustrated in FIGS. 4–9.

Referring now to FIG. 10, one embodiment of an analog mixing circuit 1000 which may be used in conjunction with one or more of the embodiments of the PC surround sound mixer discussed above is shown. In particular, analog mixing circuit 1000 preferably comprises two or more input signals 1002. In accordance with the illustrated embodiment, mixing circuit 1000 comprises three input signals, 1002-1, 1002-2 and 1002-3.

Input signals 1002 each are connected in series to a resistor 1004. In accordance with the preferred embodiment of the invention, resistors 1004 are 15k ohm resistors. Input signals 1002 preferably tie together at a common node 1006 which is the input node to the negative terminal of an operational amplifier 1008. In addition, inputs 1002 all pass through an additional resistor 1012 (preferably 15 k ohms) in a feedback loop to the output terminal or node 1014 of operational amplifier 1008. As illustrated in FIG. 10, the positive input terminal 1010 of operational amplifier 1008 is tied to ground, and a positive five volts 1016 and negative five volts 1018 is supplied to operational amplifier 1008. The output node 1014 of operational amplifier 1008 then passes through a capacitor 1020 (preferably 47 microfarad) to generate the final output signal 1022 of mixing circuit 1000. As one skilled in the art will appreciate, mixing circuit 1000 is configured to sum the information from input signals 1002 to generate the single mixed output signal 1022.

While one embodiment of an analog mixing circuit 1000 in shown in FIG. 10, one skilled in the art will appreciate that other suitable mixing circuit configurations may be used. In addition, digital signal processors may be used to mix the input signal channels and generate the surround sound output channels as discussed above with reference to FIGS. 1–9. Therefore, the PC surround sound mixer embodiments disclosed herein are not limited to the mixing circuit configuration described herein and illustrated in FIG. 10.

In conclusion, the present invention provides a novel method and apparatus for receiving a plurality of input signals having one or more input signal channels and performing a function on the input signals, such as mixing the signals, to generate a surround sound output signal having a plurality of output signal channels. While a detailed description of presently preferred embodiments of the invention have been given above, various alternatives, modifications, and equivalents will be apparent to those skilled in the art. For example, while embodiments of the present invention are described herein with reference to analog and digital processing circuits, one skilled in the art will appreciate that one or more software application programs may be used to create the PC surround sound mixing system without varying from the spirit of the invention. Therefore, the above description should not be taken as limiting the scope of the invention which is defined by the appended claims.

What is claimed is:

1. A PC audio mixer configured to mix a PC audio signal having one or more PC audio signal channels with an audio surround sound signal having three (3) or more audio surround sound channels, and one or more function generators to generate an output signal having at least three (3) output channels which are functions of said PC audio signal and said audio surround signal, said one or more function generators comprise an audio signal multiplexer configured to select at least one of said one or more PC audio signal channels or at least one of said three or more audio surround sound channels, thereby generating at least one of said at least three output channels, wherein the selection of said at least one of said one or more PC audio signal channels or said at least one of said three or more audio surround sound channels by said multiplexer is controlled by a signal detector configured to detect the presence of said one or more PC audio channels or said three or more audio surround sound channels.

2. The PC audio mixer as recited in claim 1, wherein said PC audio signal comprises an audio signal derived from a PC data signal.

3. The PC audio mixer as recited in claim 2, wherein said PC data signal comprises a PC data signal selected from the group of PC data signals consisting of MIDI, WAV, AIFF, AU, and MP3 data signals.

4. The PC audio mixer as recited in claim 1, wherein said PC audio signal comprises a PC data signal, and wherein said PC audio mixer further comprises a PC data signal decoder configured to convert said PC data signal into an audio signal.

5. The PC audio mixer as recited in claim 4, wherein said audio signal comprises either a digital audio signal or an analog audio signal.

6. The PC audio mixer as recited in claim 4, wherein said PC data signal decoder is configured to convert a PC data signal into an audio signal, said PC data signal comprising a PC data signal selected from the group of PC data signals consisting of MIDI, WAV, AIFF, AU and MP3 audio signals.

7. The PC audio mixer as recited in claim 1, wherein said audio surround sound signal comprises a serially encoded surround sound signal, and wherein said PC audio mixer further comprises a surround sound signal decoder configured to convert said encoded surround signal into a parallel multi-channel audio signal.

8. The PC audio mixer as recited in claim 7, wherein said parallel multi-channel audio signal comprises either a digital audio signal or an analog audio signal.

9. The PC audio mixer as recited in claim 1, wherein said one or more function generators is a general mathematic function operator configured to receive at least one of said PC audio signal channels and at least one of said audio surround sound channels and generate at least one of said output channels which is a mathematical function of said at least one of said PC audio signal channel and said at least one of said audio surround sound channels.

10. The PC audio mixer as recited in claim 1, wherein one of said one or more function generators comprises an audio signal mixer configured to mix at least one of said one or more PC audio signal channels with at least one of said three or more audio surround sound channels, generating at least one of said at least three output channels which is a mix of said at least one said PC audio signal channels and said at least one of said audio surround sound channels.

11. The PC audio mixer as recited in claim 10, wherein said PC audio signal and said audio surround sound signal comprise digital signals.

12. The PC audio mixer as recited in claim 10, wherein said PC audio signal is a digital signal, and said audio surround sound signal is an analog signal, and wherein said PC audio mixer further comprises a digital-to-analog converter configured to convert said PC audio signal to an analog signal before generating said output signal from said PC audio signal and said audio surround sound signal.

13. The PC audio mixer as recited in claim 10, wherein said audio surround sound signal comprises a six channel analog surround sound signal, and said PC audio signal comprises a two-channel analog audio signal.

14. The PC audio mixer as recited in claim 13, wherein said output signal comprises a six-channel surround sound output signal.

15. The PC audio mixer as recited in claim 14, wherein a first output channel comprises a mix of a first audio surround sound channel and a first PC audio signal channel, and a second output channel comprises a mix of a second audio surround sound channel and a second PC audio signal channel.

16. The PC audio mixer as recited in claim 15, further comprising a second audio signal mixer configured to mix said first PC audio signal channel with said second PC audio signal channel, generating a third PC audio signal channel, and wherein a third output channel comprises a mix of a third audio surround sound channel and said third PC audio signal channel.

17. The PC audio mixer as recited in claim 16, wherein fourth, fifth, and sixth output channels comprise fourth, fifth, and sixth audio surround sound channels, respectively.

18. The PC audio mixer as recited in claim 10, wherein said audio signal mixer is a first audio signal mixer, and wherein said PC audio mixer further comprises a second audio signal mixer configured to mix at least two of said one or more PC audio signal channels, creating a mixed PC audio signal channel.

19. The PC audio mixer as recited in claim 18, wherein said mixed PC audio signal channel is summed with at least one of said audio surround sound channels using said first audio signal mixer, creating at least one of said output channels.

20. The PC audio mixer as recited in claim 19, wherein said mixed PC audio signal channel passes through a low-pass filter before entering said first audio signal mixer.

21. The PC audio mixer as recited in claim 1, wherein said PC audio mixer is embodied in an analog hardware circuit.

22. The PC audio mixer as recited in claim 1, wherein said PC audio mixer is embodied in a digital hardware circuit.

23. The PC audio mixer as recited in claim 1, wherein said PC audio mixer is embodied in software.

24. An apparatus for generating a PC surround sound output signal from two or more audio source signals, comprising:

a PC audio source signal having one or more first audio source signal channels;

an audio surround sound signal having three or more second audio source signal channels; and a PC surround sound generating circuit configured to receive said PC audio source signal and said audio surround sound signal, and generate said PC surround sound output signal having three (3) or more output channels which are functions of said PC audio source signal and said audio surround sound signal.

25. The apparatus as recited in claim 24, wherein said PC audio source signal comprises a PC data signal, and wherein said apparatus further comprises a PC data signal decoder configured to convert said PC data signal into an audio signal.

26. The apparatus as recited in claim 25, wherein said PC data signal decoder is configured to convert a PC data signal into an audio signal, said PC data signal comprising a PC data signal selected from the group of PC data signals consisting of MIDI, WAV, AIFF, AU and MP3 data signals.

27. The apparatus as recited in claim 24, wherein said audio surround sound signal is an encoded serial surround sound signal, and wherein said apparatus further comprises a surround sound decoder configured to decode said encoded serial surround sound signal into a parallel multi-channel surround sound signal.

28. The apparatus as recited in claim 24, wherein one or more function generators generate said output.

29. The apparatus as recited in claim 28, wherein said one or more function generates comprises a first mixing circuit configured to mix at least one of said first audio source signal channels with at least one of said second audio source signal channels, generating at least one of said three or more output channels which is a mix of said at least one of said first audio source signal channels and said at least one of said second audio source signal channels.

30. The apparatus as recited in claim 28, wherein one of said one or more function generators comprises an audio signal multiplexer configured to select at least one of said first audio source signal channels or at least one of said second audio source signal channels, generating at least one of said at least three output channels, the selection of said at least one of said first audio source signal channels or said at least one of said second audio source signal channels by said multiplexer being controlled by a signal detector configured to detect the presence of said one or more first audio source signal channels or said second audio source signal channels.

31. The apparatus as recited in claim 28, wherein said one or more function generators is a general mathematic function operator configured to receive at least one of said first audio source signal channels and at least one of said second audio source signal channels and generate at least one of said output channels which is a mathematical function of said at least one of said first audio source signal channel and said at least one of said second audio source signal channels.

32. A PC sound circuit configured to receive a PC audio signal and an audio surround sound signal, wherein said audio surround sound signal comprises a six-channel surround sound signal, and said PC audio signal comprises a two-channel signal and generate an audio output signal comprising one of said audio source signals, wherein said output signal comprises a six-channel surround sound output signal, and wherein a multiplexing circuit is configured to generate a first surround sound output channel comprising either a first audio surround sound channel or a first PC audio channel, and a second surround sound output channel comprising either a second audio surround sound channel or a second PC audio channel, said PC sound circuit comprising an audio signal multiplexing circuit configured to receive said two or more audio source signals, select one of said two or more audio source signals, and generate an audio output signal comprising the selected one of said two or more audio source signals.

33. The PC sound circuit as recited in clam 32, wherein said PC audio signal comprises a PC data signal, and wherein said PC sound circuit further comprises a PC data signal decoder configured to convert said PC data signal into an analog audio output signal.

34. The PC sound circuit as recited in claim 32, wherein said two or more audio source signals are digital signals.

35. The PC sound circuit as recited in claim 32, wherein one of said two or more audio source signals is a digital signal, and wherein said PC sound circuit further comprises a digital-to-analog converter configured to convert said one of said two or more audio source signals to an analog signal before entering said audio signal multiplexing circuit.

36. The PC sound circuit as recited in claim 32, wherein said audio output signal comprises a six-channel surround sound output signal if said multiplexing circuit is configured to select said audio surround sound signal, and said audio output signal comprises a two-channel output signal if said multiplexing circuit is configured to select said PC audio signal.

37. The PC sound circuit as recited in claim 32, further comprising an audio signal mixer configured to mix said first PC audio channel with said second PC audio channel, generating a third PC audio channel, and wherein said multiplexing circuit is configured to generate a third surround sound output channel comprising either a third audio surround sound channel or said third PC audio channel.

38. The PC sound circuit as recited in claim 37, wherein fourth, fifth, and sixth surround sound output channels comprise fourth, fifth, and sixth audio surround sound channels, respectively.

39. The PC sound circuit as recited in claim 32, wherein said audio surround sound signal is an encoded serial surround sound signal, and wherein said sound circuit further comprises a surround sound decoder configured to decode said encoded serial surround sound signal into a parallel multi-channel surround sound signal.

40. A PC sound circuit configured to receive a PC audio signal and an audio surround sound signal, wherein said audio surround sound signal comprises a six-channel surround sound signal, and said PC audio signal comprises a two-channel signal and generate an audio output signal comprising one of said audio source signals, wherein said PC audio signal comprises a PC data signal, wherein said output signal comprises a six-channel surround sound output signal, and wherein a multiplexing circuit is configured to generate a first surround sound output channel comprising either a first audio surround sound channel or a first PC audio channel, and a second surround sound output channel comprising either a second audio surround sound channel or a second PC audio channel, said PC sound circuit comprising an audio signal multiplexing circuit configured to receive said two or more audio source signals, select one of said two or more audio source signals, and generate an audio output signal comprising the selected one of said two or more audio source signal and wherein said apparatus further comprises a PC data signal decoder configured to convert said PC data signal into an audio signal.

41. A system for generating and playing a PC audio output signal from two or more source signals, comprising:

a computer comprising a processor, a PC audio generating circuit configured to receive at least first and second audio source signals, wherein each of said at least first and second audio source signals comprise one or more audio source signal channels, and one or more function generators to generate said PC audio output and generate a PC audio output signal having three (3) or more output channels from said at least first and second audio source signals, said output channels being functions of said at least first and second audio source signals, wherein one of said or more function generators comprises an audio signal multiplexer configured to select at least one of said one or more audio source signal channels of a first one of said at least first and second audio source signals or at least one of said one or more audio source signal channels of a second one of said at least first and second audio source signals, thereby generating at least one of said at least three output channels, the selection of said at least one of said one or more audio source signal channels of said first one of said at least first and second audio source signal or said at least one of said one or more audio source signal channels of said second one of said at least first and second audio source signals by said multiplexer being controlled by a signal detector configured to detect the presence of said at least one of said one or more audio source signal channels of said first one of said at least first and second audio source signals or said at least one of said one or more audio source signal channels of said second one of said at least first and second audio source signals; and three or more speakers configured to receive said output channels from said PC audio generating circuit and play said PC audio output signal.

42. The system as recited in claim 41, wherein one of said at least first and second audio source signals comprises an audio signal derived from a PC data signal.

43. The system as recited in claim 42, wherein said PC data signal comprises a PC data signal selected from the group of PC data signals consisting of MIDI, WAV, AIFF, AU and MP3 data signals.

44. The system as recited in claim 41, wherein one of said at least first and second audio source signals comprises a PC data signal, and wherein said PC audio mixer further comprises a PC data signal decoder configured to convert said PC data signal into an audio signal.

45. The system as recited in claim 44, wherein said PC data signal decoder is configured to convert a PC data signal into an audio signal, said PC data signal comprising a PC data signal selected from the group of PC data signals consisting of MIDI, WAV, AIFF, AU and MP3 data signals.

46. The system as recited in claim 41, wherein one of said at least first and second audio source signals comprises a serially encoded surround sound signal, and wherein said PC audio mixer further comprises a surround sound signal decoder configured to convert said encoded surround sound signal into a parallel multi-channel audio signal.

47. The system as recited in claim a 44, wherein one of said one or more function generators comprises an audio signal mixer configured to mix at least one of said one or more audio source signal channels of a first one of said at least first and second audio source signals with at least one of said one or more audio source signal channels of a second one of said at least first and second audio source signals, generating at least one of said at least three output channels which is a mix of said at least one of said one or more audio source signal channels of said first one of said at least first and second audio source signals and said at least one of said one or more audio source signal channels of said second one of said at least first and second audio source signals.

48. The system as recited in claim 41, wherein said one or more function generators is a general mathematic function operator configured to receive at least one of said one or more audio source signal channels of a first one of said at least first and second audio source signals and at least one of said one or more audio source signal channels of a second one of said at least first and second audio source signals and generate at least one of said output channels which is a mathematical function of said at least one of said one or more audio source signal channels of said first one of said at least first and second audio source signals and said at least one of said one or more audio source signal channels of said second one of said at least first and second audio source signals.

49. A method for generating a PC audio signal having three (3) or more audio signal channels from two or more audio input signals having one or more audio signal channels, wherein said PC audio signal comprises six (6) surround sound signal channels, comprising the steps of:
receiving said two or more audio input signals, wherein said first one of said two or more audio input signals comprises a six-channel encoded surround sound signal, and said second one of said two or more audio input signals comprises a two channel PC audio input signal; and
mixing at least one of said one or more audio signal channels from a first one of said two or more audio input signals with at least one of said one or more audio signal channels from a second one of said two or more audio input signals, generating one or more of said three or more PC audio signal channels of said PC audio signal, wherein a first channel of said first one of said two or more audio input signals is mixed with a first channel of said second of said two or more audio input signals, generating a first one of said six (6) PC audio signal channels of said PC audio signal, and wherein a second channel of said first one of said two or more audio input signals is mixed with a second channel of said second of two or more audio input signals, generating a second one of said six (6) PC audio signal channels of said PC audio signal.

50. The method as recited in claim 49, wherein said first and said second channels of said second of said two or more input signals are mixed together, generating a mixed audio channel, and wherein said mixed audio channel is mixed with a third channel of said first of said two or more audio input signals, generating a third one of said six (6) PC audio signal channels of said PC audio signal.

51. The method as recited in claim 49, wherein one or more of said two or more audio input signals are digital signals, and wherein said method further comprises converting said one or more digital signals to analog signals before performing said mixing step.

52. The method as recited in claim 49, wherein one or more of said two or more audio input signals comprise serial surround sound signals having six (6) channels encoded therein, and wherein said method further comprises the step of decoding said serial surround sound signals into six (6) independent surround sound channels before performing said mixing step.

53. The method as recited in claim 49, wherein one or more of said two or more audio input signals comprise PC data signals, and wherein said method further comprises the step of decoding said PC data signals into audio signals before performing said mixing step.

54. The method as recited in claim 53, wherein said PC data signals comprise PC data signals selected from the group of PC data signals consisting of MIDI, WAV, AIFF, AU and MP3 data signals.

55. The method as recited in claim 49, wherein said two or more audio input signals are in digital form and said PC audio signal channels are in digital form, and wherein said method further comprises the step of converting said PC audio signal channels to analog form after said mixing step.

56. A PC audio mixer configured to mix a PC audio signal having one or more PC audio signal channels with an audio surround sound signal having three (3) or more audio surround sound channels, wherein said audio surround sound signal comprises a six channel analog surround sound signal, and said PC audio signal comprises a two-channel analog audio signal, and one or more function generators to generate an output signal having at least three (3) output channels which are functions of said PC audio signal and said audio surround signal, wherein said output signal comprises a six-channel surround sound output signal wherein one of said one or more function generators comprises an audio signal mixer configured to mix at least one of said one or more PC audio signal channels with at least one of said three or more audio surround sound channels, thereby generating at least one of said at least tree output channels which is a mix of said at least one said PC audio signal channels and said at least one of said audio surround sound channels, wherein a first output channel comprises a mix of a first audio surround sound channel and a first PC audio signal channel, and a second output channel comprises a mix of a second audio surround sound channel and a second PC audio signal channel.

57. A PC audio mixer configured to mix a PC audio signal having one or more PC audio signal channels with an audio surround sound signal having three (3) or more audio surround sound channels, and generate an output signal having at least three (3) output channels which are functions of said PC audio signal and said audio surround signal, and an audio signal mixer configured to mix at least one of said one or more PC audio signal channels with at least one of said three or more audio surround sound channels, generating at least one of said at least three output channels, which is a mix of said at least one said PC audio signal channels and said at least one of said audio surround sound channels.

58. The PC audio mixer as recited in claim 57, wherein said PC audio signal comprises an audio signal derived from a PC data signal.

59. The PC audio mixer as recited in claim 58, wherein said PC data signal comprises a PC data signal selected from the group of PC data signals consisting of MIDI, WAV, AIFF, AU, and MP3 data signals.

60. The PC audio mixer as recited in claim 57, wherein said PC audio signal comprises a PC data signal, and wherein said PC audio mixer further comprises a PC data signal decoder configured to convert said PC data signal into an audio signal.

61. The PC audio mixer as recited in claim 60, wherein said audio signal comprises either a digital audio signal or an analog audio signal.

62. The PC audio mixer as recited in claim 60, wherein said PC data signal decoder is configured to convert a PC data signal into an audio signal, said PC data signal comprising a PC data signal selected from the group of PC data signals consisting of MIDI, WAV, AIFF, AU and MP3 audio signals.

63. The PC audio mixer as recited in claim 57, wherein said audio surround sound signal comprises a serially encoded surround sound signal, and wherein said PC audio mixer further comprises a surround sound signal decoder configured to convert said encoded surround signal into a parallel multi-channel audio signal.

64. The PC audio mixer as recited in claim 63, wherein said parallel multi-channel audio signal comprises either a digital audio signal or an analog audio signal.

65. The PC audio mixer as recited in claim 57, wherein one or more function generators generate said output.

66. The PC audio mixer as recited in claim 65, wherein one of said one or more function generators comprises an audio signal mixer configured to mix at least one of said one or more PC audio signal channels with at least one of said three or more audio surround sound channels, generating at least one of said at least three output channels which is a mix of said at least one said PC audio signal channels and said at least one of said audio surround sound channels.

67. The PC audio mixer as recited in claim 66, wherein said audio surround sound signal comprises a six channel analog surround sound signal, and said PC audio signal comprises a two-channel analog audio signal.

68. The PC audio mixer as recited in claim 67, wherein said output signal comprises a six-channel surround sound output signal.

69. The PC audio mixer as recited in claim 68, wherein a first output channel comprises a mix of a first audio surround sound channel and a first PC audio signal channel, and a second output channel comprises a mix of a second audio surround sound channel and a second PC audio signal channel.

70. The PC audio Her as recited in claim 69, further comprising a second audio signal mixer configured to mix said first PC audio signal channel with said second PC audio signal channel, generating a third PC audio signal channel, and wherein a third output channel comprises a mix of a third audio surround sound channel and said third PC audio signal channel.

71. The PC audio mixer as recited in claim 70, wherein fourth, fifth, and sixth output channels comprise fourth, fifth, and sixth audio surround sound channels, respectively.

72. The PC audio mixer as recited in claim 66, wherein said PC audio signal and said audio surround sound signal comprise digital signals.

73. The PC audio mixer as recited in claim 66, wherein said PC audio signal is a digital signal, and said audio surround sound signal is an analog signal, a wherein said PC audio mixer further comprises a digital-to-analog converter configured to convert said PC audio signal to an analog signal before generating said output signal from said PC audio signal and said audio surround sound signal.

74. The PC audio mixer as recited in claim 66, wherein said audio signal mixer is a first audio signal mixer, and wherein said PC audio mixer further comprises a second audio signal mixer configured to mix at least two of said one or more PC audio signal channels, creating a mixed PC audio signal channel.

75. The PC audio mixer as recited in claim 74, wherein said mixed PC audio signal channel is summed with at least one of said audio surround sound channels using said first audio signal mixer, creating at least one of said output channels.

76. The PC audio mixer as recited in claim 75, wherein said mixed PC audio signal channel passes through a low-pass filter before entering said further audio signal mixer.

77. The PC audio mixer as recited in claim 65, wherein one of said one or more function generators comprises an audio signal multiplexer configured to select at least one of said one or more PC audio signal channels or at least one of said three or more audio surround sound channels, generating at least one of said at least three output channels.

78. The PC audio mixer as recited in claim 65, wherein said one or more function generators is an audio signal modulator configured to modulate at least one of said audio surround sound channels with at least one of said PC audio signal channels generating at least one of said output channels which is a modulation of said at least one of said surround sound channels with said at least one of said PC audio signal channel.

79. The PC audio mixer as recited in claim 65, wherein said one or more function generators is a general mathematic function operator configured to receive at least one of said PC audio signal channels and at least one of said audio surround sound channels and generate at least one of said output channels which is a mathematical function of said at least one of said PC audio signal channel and said at least one of said audio surround sound channels.

80. The PC audio mixer as recited in claim 57, wherein said PC audio mixer is embodied in an analog hardware circuit.

81. The PC audio mixer as recited in claim 57, wherein said PC audio mixer is embodied in a digital hardware circuit.

82. The PC audio mixer as recited in claim 57, wherein said PC audio mixer is embodied in software.

\* \* \* \* \*